United States Patent [19]
Tabuchi et al.

[11] Patent Number: 5,445,256
[45] Date of Patent: Aug. 29, 1995

[54] ELECTROMAGNETIC CLUTCH

[75] Inventors: Yasuo Tabuchi, Anjyo; Masashi Tobayama, Obu; Junichi Ohguchi, Toyoake; Akira Kishibuchi, Nagoya, all of Japan

[73] Assignee: Nippondenso Co., Ltd., Kariya, Japan

[21] Appl. No.: 194,287

[22] Filed: Feb. 10, 1994

[30] Foreign Application Priority Data

Apr. 26, 1993 [JP] Japan .............................. 5-021840 U

[51] Int. Cl.⁶ ...................... F16D 27/10; F16D 27/14
[52] U.S. Cl. ................................ 192/84 C; 192/30 V; 192/106.1
[58] Field of Search ................. 192/84 C, 84 A, 30 V, 192/106.1; 464/89, 92

[56] References Cited

U.S. PATENT DOCUMENTS

| | | | |
|---|---|---|---|
| 3,455,421 | 7/1969 | Miller | 192/84 C |
| 3,565,223 | 2/1971 | Pierce | 192/84 C |
| 4,296,851 | 10/1981 | Pierce | 192/84 C |
| 4,574,930 | 3/1986 | Koitabashi | 192/84 C |
| 4,624,354 | 11/1986 | Koitabashi | 192/106.1 X |
| 4,972,932 | 11/1990 | Nakamura et al. | 192/84 C X |
| 5,009,297 | 4/1991 | Gonda | 192/30 V X |
| 5,046,594 | 9/1991 | Kakinuma | 192/84 C |
| 5,119,915 | 6/1992 | Nelson | 192/106.1 |
| 5,195,625 | 3/1993 | Chang et al. | 192/84 C |
| 5,232,076 | 8/1993 | Nakagawa et al. | 192/84 C |

FOREIGN PATENT DOCUMENTS

| | | | |
|---|---|---|---|
| 56-62430 | 5/1981 | Japan . | |
| 63-280930 | 11/1988 | Japan | 192/84 C |
| 1168028 | 11/1989 | Japan . | |

*Primary Examiner*—Andrea L. Pitts
*Attorney, Agent, or Firm*—Cushman, Darby & Cushman

[57] ABSTRACT

An electromagnetic clutch capable of reducing a noise generated upon contact of an armature with rotor. Connecting member 20 for connecting inner and outer rings 5a and 5b of the armature are integrally formed with arms 19 extending radially inwardly from locations where the connection members 20 are connected to the inner ring 5a by rivets 12. The arms 17 are in face to face contact with an elastic member 18 made of rubber, which is held by the inner hub 7 by means of a retainer 19. Upon the movement of the armature 5 toward to rotor 4 by means of an electromagnetic force, just before the contact of the armature 5 with the rotor 4, a steep increase in a force for opposing the movement of the armature 5 with respect to the rotor 4 is obtained, thereby reducing an impact upon the contact, and reducing the noise.

17 Claims, 21 Drawing Sheets

ELECTROMAGNETIC CLUTCH

BACKGROUND OF THE INVENTION

1. Field of the Invention

The present invention relates to an electromagnetic clutch for obtaining a selective connection of a rotating movement from a rotating movement source to a receiver of the rotating movement. The present invention can be suitably used for a clutch arranged between a compressor for an air conditioning device for an automobile and the crankshaft of an internal combustion engine. The present invention is, in particular, related to a decrease in the noise which is generated when a rotor and an armature contact each other due to an electromagnetic force therebetween.

2. Description of Related Art

Known is an electromagnetic clutch which has a rotor which is connected to a source of rotating movement, such as a crankshaft of an internal combustion engine, an armature which is arranged so as to be oppositely faced with the rotor, a solenoid for generating an electromagnetic force, a hub as a receiver of a rotating movement, which is connected to a compressor of an air conditioning apparatus, and plate springs for connecting the armature with the hub. A solenoid is also provided, which produces, when energized, an electromagnetic force, which causes the armature to be moved against a force of the plate springs, so that the armature contacts the rotor face to face, which causes the rotational movement from the rotor to be transmitted to the hub via the armature and the plate springs.

In the prior art construction, when the solenoid is in a de-energized condition, the armature is spaced from the rotor so that a small gap is created between the faced surfaces of the armature and the rotor. Upon the energization of the solenoid, a collision occurs between the armature and the rotor, which causes a noise to be created. Due to the fact that the armature is supported on the hub by way of the plate springs, the armature has a relatively low rigidity. As a result of the low rigidity, the collision of the armature and the rotor causes the armature to vibrate, which causes a large amount of noise to be generated. In other words, a large noise is generated when the armature is moved to be in contact with the rotor due to the energization of the solenoid.

SUMMARY OF THE INVENTION

An object of the present invention is to provide an electromagnetic clutch capable of overcoming the above mentioned difficulties in the prior art.

Another object of the present invention is to provide an electromagnetic clutch capable of reducing the noise generated when the armature contacts the rotor.

In order to attain the above mentioned object, according to the first aspect of the present invention, an electromagnetic clutch is provided, comprising:

a stationary electromagnetic coil which generates an electromagnetic force when energized;

a rotor for receiving the rotating movement from a rotating movement source;

an armature which, when subject to the electromagnetic force from the coil, comes into contact with the rotor;

a rotating driven member which rotates together with the armature;

plate spring members arranged between the armature and the rotating driven member for causing the armature and the rotor to be normally spaced from each other;

the electromagnetic force causing the armature to be moved toward the rotor against the force of the plate springs for causing them to be contacted with each other;

arms extending integrally and inwardly from corresponding plate springs;

a retainer member connected to the rotating driven member located radially inside the armature, and;

an elastic member arranged between the arms and the retainer member.

According to the second aspect of the present invention, an electromagnetic clutch is provided, comprising:

a stationary electromagnetic coil which generates an electromagnetic force when energized;

a rotor connected to an outside rotating source to be subjected to a rotating movement therefrom;

an armature which, upon being subject to the electromagnetic force from the coil, comes into contact with the rotor, the armature being constructed of an inner and an outer ring, which are radially separate with each other;

a rotating driven member which rotates together with the armature;

plate spring members arranged between the armature and the rotating driven member for causing the armature and the rotor to be normally spaced from each other;

the electromagnetic force causing the armature to be moved toward the rotor against the force of the plate springs for causing them to come into contact with each other;

connecting members for connecting the inner and outer rings of the armature with each other, and;

an elastic member arranged between the armature arms and the connecting members.

BRIEF EXPLANATION OF ATTACHED DRAWINGS

DESCRIPTION OF PREFERRED EMBODIMENTS

Figure 1:
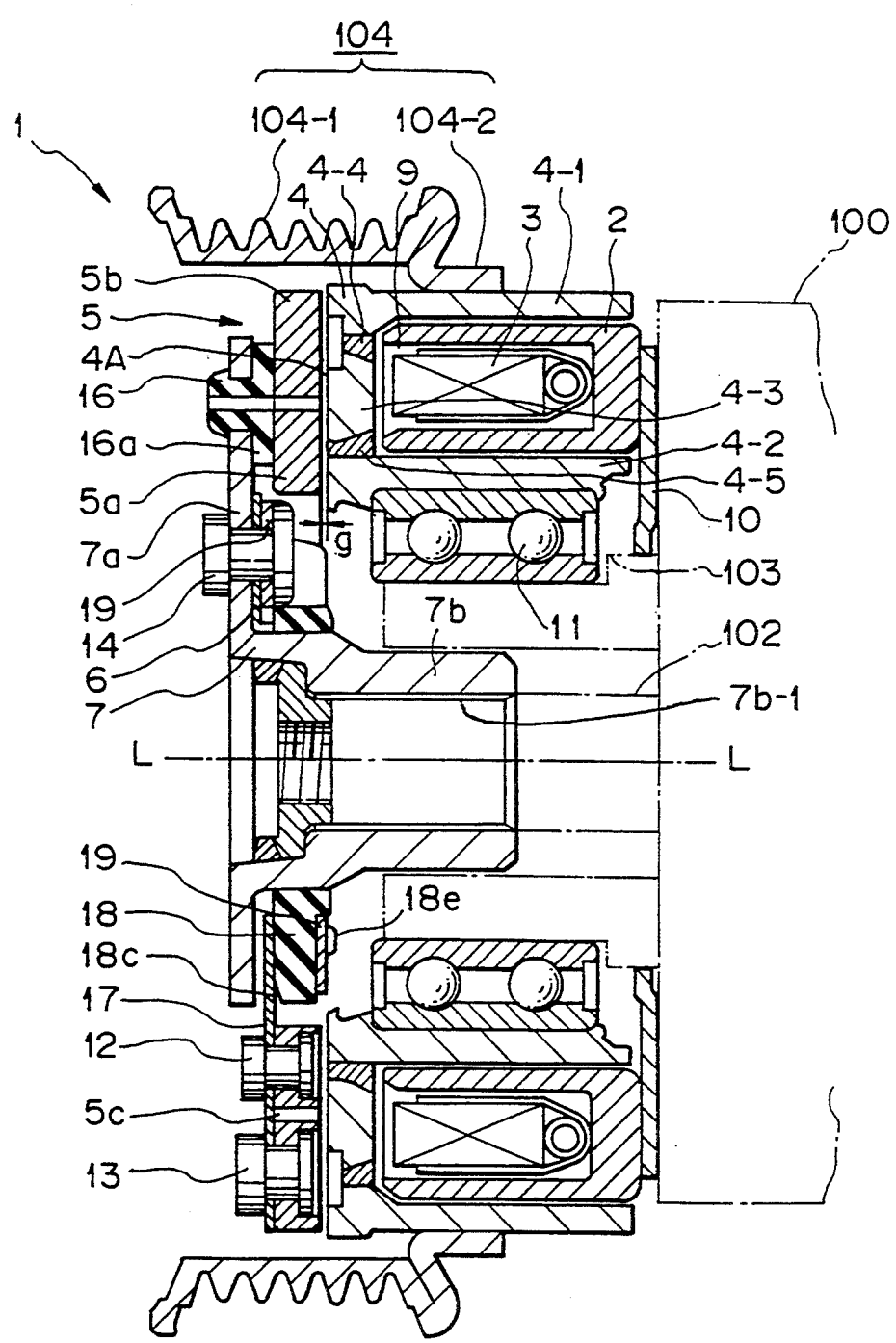
FIG. 1 is a longitudinal sectional view of an electromagnetic clutch according to the present invention.

Now, embodiments of an electromagnetic clutch with an engaging noise reduction device according to the present invention will be explained with reference to the attached drawings. In a first embodiment shown by FIGS. 1 to 11, a reference numeral 1 denotes generally an electromagnetic clutch which is adapted for a connection of a crankshaft of an internal combustion engine (not shown) with a compressor 100 in a refrigerating circuit for an air conditioning system of an automobile. The compressor 100 is not an essential part of the present invention, and therefore, its outline only is shown.

The electromagnetic clutch 1 includes a stator 2, an electromagnetic coil 3 stored in the stator 2, a rotor 4 which is in kinematic connection with the crankshaft (not shown) of the engine for receiving a rotating movement therefrom, an armature 5 which is to be engaged with the rotor by an electromagnetic force generated by the electromagnetic coil 3, an inner hub 7 which is under a spline engagement with a rotating shaft 102 of the compressor 100, and plate springs 6 for connecting the hub 7 with the armature 5 and which allow the rotating movement to be transmitted from the rotor to the shaft 102 under the engaged condition of the clutch 1.

The electromagnetic coil is constructed from a winding of an electric wire with an insulating outer tubular layer. The stator 2 is made from a resin material such as an epoxy resin, and forms a ring of a substantially C cross sectional shape, which forms an annular recess opened axially, in which the electromagnetic coil 3 is stored and is fixed to the stator together with a filler material. Connected, fixedly, to the stator 2 is a ring shaped supporting member 10 which is also fixedly connected to a housing of the compressor 100.

The rotor 4 is made of a magnetized material such as a steel, and also forms a ring shape of a substantially C cross sectional shape which defines an annular recess opened axially, in which the stator 2 is freely inserted, so that the rotor 4 is rotatable with respect to the stator 2. The rotor 4 has an outer ring portion 4-1, an inner ring portion 4-2, and an annular portion 4-3 extending radially, which connects the outer and the inner ring portions 4-1 and 4-2. A ring shaped portion 4-4 made of a non-magnetizing material is arranged between the portions 4-1 and 4-3, and a ring shaped portion 4-5 made of a non-magnetizing material is also arranged between the portions 4-2 and 4-3, although these portions 4-1 to 4-5 are constructed as a rigid assembly. This construction of the rotor 4 provides a radially divided construction from the view point of transmission of a magnetic flux, which cooperates with a divided construction of the armature 5 as will be fully described later. This arrangement is effective to increase the magnetic attracting force between the rotor 4 and the armature 5. The rotor 4 forms an engaging plane 4A which extends transverse to the axis of rotation L—L of the shaft 102. A bearing unit 11 is provided between a boss portion 103 of the housing of the compressor 100 and the inner ring portion 4-2 of the rotor 4, so that the rotor 4 is rotatably supported by the compressor housing.

A pulley assembly 104 is constructed of a pulley portion 104-1 and a base portion 104-2 which is fixedly connected to the outer ring portion 4-1 of the rotor 4 by any suitable means such as welding. The pulley portion 104-1 includes a plurality of axially spaced grooves which are V-shaped in cross section and in which belts (not shown) of V cross sectional shape are engaged. The belts are also engaged with a pulley (not shown) on a crankshaft, so that the rotational movement of the crankshaft of the internal combustion engine is transmitted to the pulley assembly 104 via the V belts.

Figure 2:
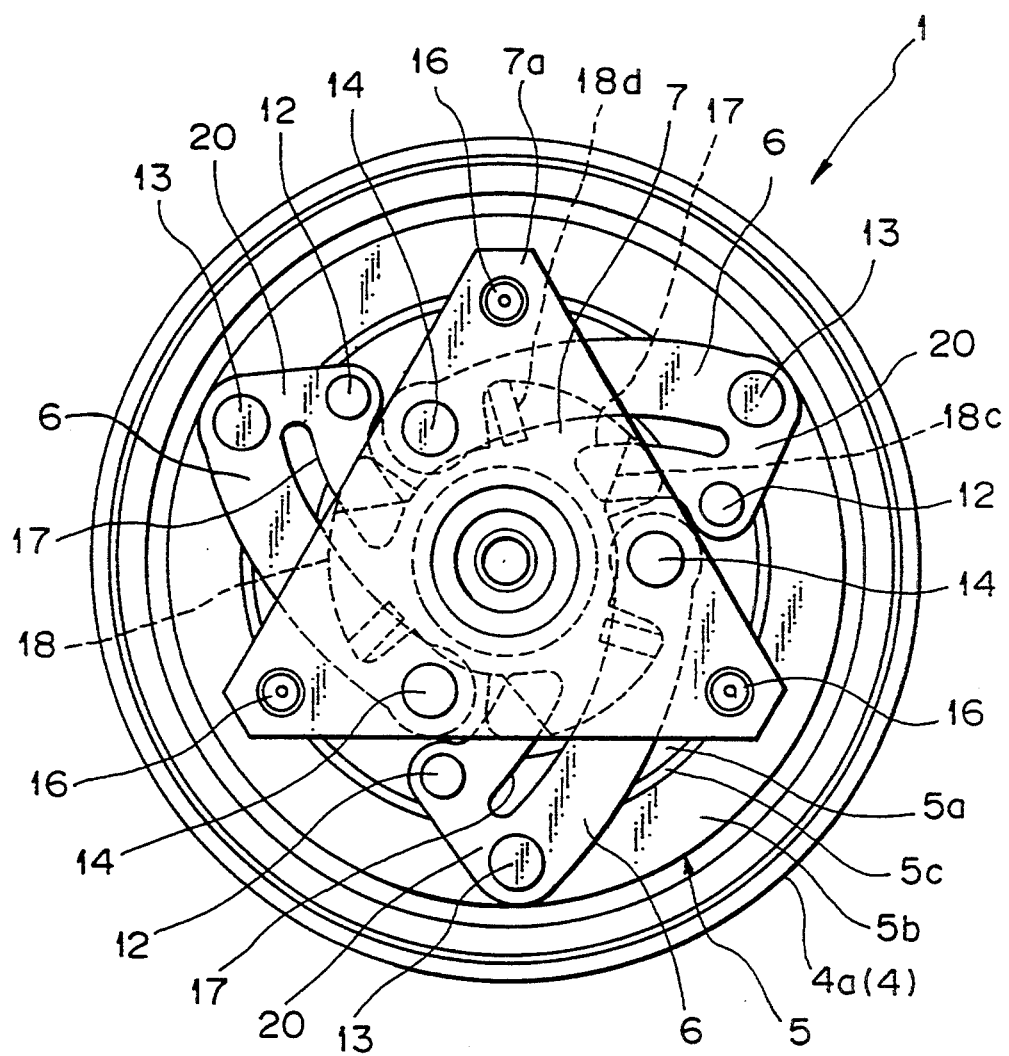
FIG. 2 is a front view of the electromagnetic clutch 35 in FIG. 1.

The armature 5 is arranged to face the engaging surface 4A of the rotor 4 with a small gap g therebetween. The armature 5 is constructed of an inner ring member 5a and an outer ring 5b which are made of a magnetizing material such as a steel. The inner and outer ring members 5a and 5b are located on the same plane transverse to the axis of rotation of the rotor L—L, while a small annular gap 5c is created therebetween as shown in FIG. 2. This gap is called a magnetic flux separation gap.

Connecting members 20, are as shown in FIG. 2, made integral with the plate springs 6 and are arranged between the inner and outer rings members 5a and 5b, of the armature 5. Each connecting member 20 is connected, at its first end, to the inner ring member 5a by means of a rivet 12, and, at its second end, to the outer ring member 5b by means of a rivet 13. This second end of the connecting member 20 corresponds to a first end of the spring 6. As a result, the inner and outer rings 5a and 5b are bridged with each other by means of the connecting members 20. Each of the plate springs 6 together with the connecting member 20 is made from a non-magnetizing material, such as stainless steel based on austenite, so that magnetic flux between the inner and outer rings 5a and 5b of the armature 5 is prevented.

As shown in FIG. 1, the inner hub 7 is formed by a flange portion 7a, which forms a triangular plate as shown in FIG. 2 and a tubular portion 7b, which is integral with the flange portion 7a. The tubular portion 7b forms an inner spline portion 7b-1, which is under a spline engagement with the outer spline on the shaft 102 of the compressor. The flange portion 7a is connected to each of the plate springs 6 at a second end of the spring by means of a rivet 14. Due to the connection of the inner and outer rings 5a and 5b to the connecting member 20 by means of the rivets 12 and 13, respectively, as well as the connection of the plate spring 6 to the flange portion 7a of the hub by means of the rivet 14, the rotating movement is transmitted between the armature 5 and the inner hub 7. Furthermore, each of the plate springs 6 generates an elastic force which biases the armature 5, so that it is moved away from the rotor 4, so that the gap g is created between the faced end surfaces of the rotor 4 and the armature 5.

The flange portion 7a has, at the apexes of its triangular shape, as shown in FIG. 2, holes into which respective stopper cushion members 16, made of a rubber material, are press fitted. As shown in FIG. 1, each of the stopper cushion members 16 is formed with a radially projected flange portion 16a which is located between the faced surfaces of the armature 5 and the flange portion 7a of the inner hub 7 at locations along the annular gap 5c between the inner and outer rings 5a and 5b. Thus the cushion members 16 engage with both of the rings 5a and 5b, which prevents the armature 5 from being spaced from the rotor 4 further than the gap g of the predetermined value of, for example, 0.5 mm, when the electromagnetic coil 3 is in a de-energized condition. Thus, at this non-energized condition, the flange portions 16a cause the corresponding plate springs 6 to be flexed to create a pre-load condition, as will be fully described later.

As shown in FIG. 2, each of the plate springs 6 has an integral arm portion 17, which extends radially, inwardly. An annular elastic member 18 is inserted on the tubular portion 7b of the inner hub. A spring holder plate 19 is, as will be described later, fixedly connected to the inner hub 7, so that the annular spring member 18 abuts, at its end surface away from the flange portion 7a. The annular elastic member 18 is sandwiched between the arm portions 17 and the holder member 19. The details of the construction of the elastic member 18 as well as the holder member 19 will be fully described later.

Figure 5:
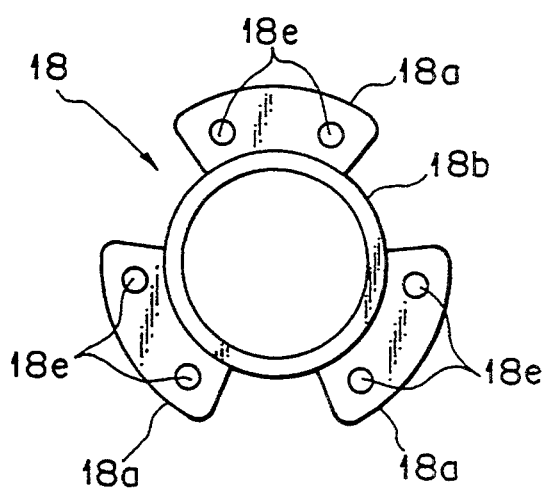
FIG. 5 is a rear view of the elastic member in FIG. 1.
Figure 6:
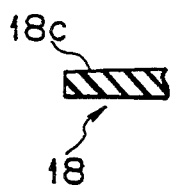
FIG. 6 is a cross sectional view taken along lines VI—VI in FIG. 3.
Figure 7:
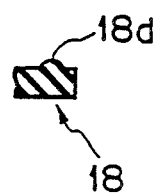
FIG. 7 is a cross sectional view taken along lines VII—VII in FIG. 3.

The annular elastic member 18 is made of a rubber material, such as natural rubber or synthetic rubber (such as a nitrile rubber or butyl rubber) of an elasticity which is smaller than that of the plate spring 6. The elastic member 18 is, as shown in FIG. 5, constructed with an annular base portion 18b which is inserted onto the tubular portion 7b of the inner hub 7, and a plurality of equiangularly spaced arc shaped portions 18a extending radially from the annular base portion 18b for a desired circumferential length. The number of the arc shaped portions 18a corresponds to the number of the plate springs. In this embodiment, three plate springs 6 are provided. Thus, the number of the arc shaped portions 18a is also three. Each arc shaped portion 18a forms, generally, axially spaced apart parallel side walls. However, on the side wall adjacent the plate spring 6, at a circumferential end of the arc shaped portion 18a faced with the corresponding arm portion 17 of the plate spring 6, the side wall is slightly inclined radially outwardly so that it is away from the plate spring 6, so that a tapered, presser portion 18c is created as shown in FIGS. 1 and 6. This tapered portion 18c of the side wall of the arc portion 18a of the spring member 18 allows the arm portion 17 to be elasticity deformed in an assembled condition of the arm portion 17. The presser portion 18c functions to suppress a vibration of the corresponding arm portion 17. Furthermore, the tapered shape of the arc shaped portion 18c of the elastic member 18 functions, upon contact of the armature 5 with the rotor 4, to create a desired pressing area of the arm portion 17 with the elastic member 18 and to reduce the stress created in the arm portion 17 in resisting movement of the armature 5 toward the rotor.

Figure 3:
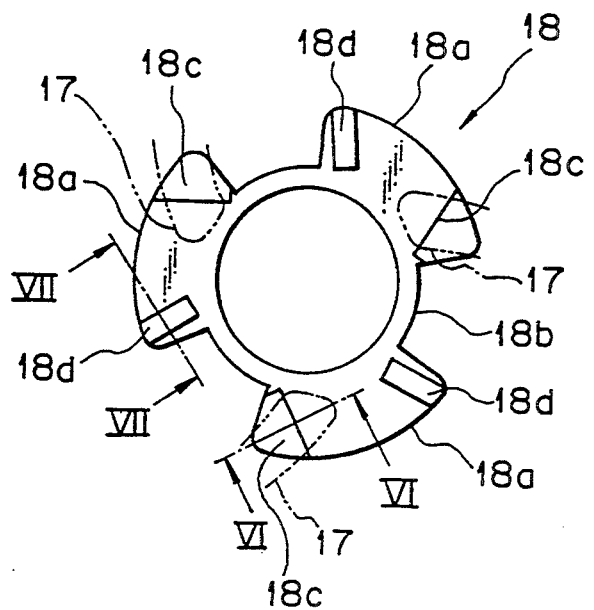
FIG. 3 is a front view of an elastic member in FIG. 1.

Also, on the side wall adjacent the plate spring 6, at a circumferential end of the arc shaped portion 18a spaced from the corresponding arm portion 17 of the plate spring 6, the side wall is formed with a portion 18d (FIG. 7) extending toward the corresponding plate spring 6 to make contact therewith. As shown in FIG. 3, the projection 18d extends substantially radially. The projected portion 18d functions to suppress the vibration of the plate spring 6, and to reduce the stress generated in the plate spring 6 by its elastic deformation, in resisting movement of the armature 5 toward the rotor 4.

Figure 4:
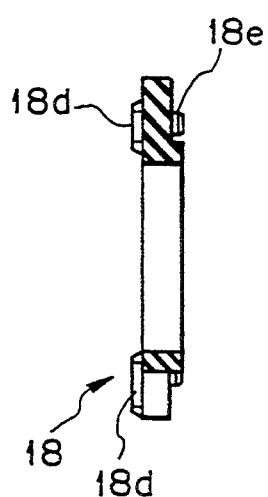
FIG. 4 is a lateral view of the elastic member in FIG. 3.
Figure 8:
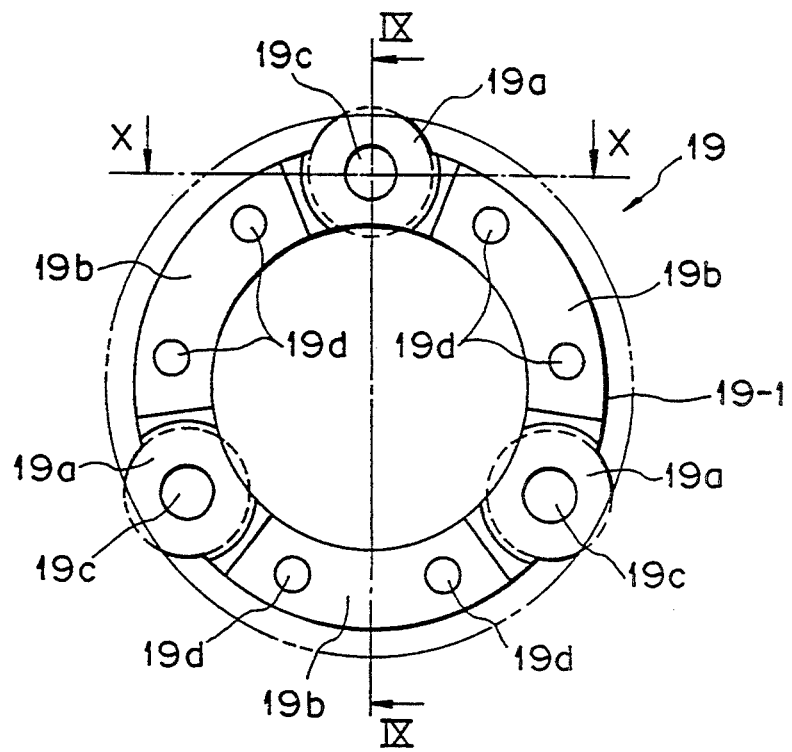
FIG. 8 is a front view of a retainer in FIG. 1.
Figure 9:
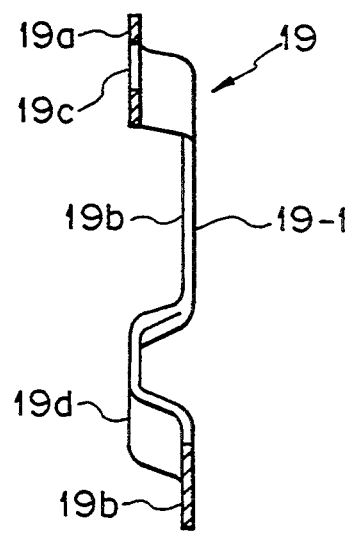
FIG. 9 is a cross sectional view taken along lines IX—IX in FIG. 8.
Figure 10:
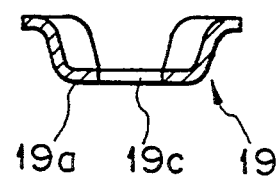
FIG. 10 is a cross sectional view taken along lines X—X in FIG. 8.

On the side wall adjacent the retainer member 19, at circumferentially opposite ends of the arc shaped portion 18a, the side wall is formed with a pair of opposite projections 18e as shown in FIGS. 4 and 5. These projections 18e are for positioning the elastic member 18 with respect to the retainer member 19. Namely, as shown in FIG. 8, the retainer member 19 has holes 19d, into which the projections 18e are engaged.

The retainer member 19 is made from a sheet of metal, such as steel, by stamping. The retainer member 19, in the shape of a ring, is formed with three circumferentially spaced base portions 19-1 and three circumferentially spaced fixing portions 19a which project axially from the base portions 19-1, so that circumferentially spaced storing portions (recesses) 19b are created between adjacent fixing portions 19a for storing the arc shaped portions 18a of the elastic member 18. Each of the base portion 19-1 has a pair of positioning openings 19d, with which the projections 18e of the arc shaped portion 18a of the elastic member 18 engage, which allows the elastic member 18 to be fixedly positioned on the retainer 19. As shown in FIG. 8, each of the fixing portions 19a has a fixing opening 19c into which the rivet 14 is inserted for connecting the retainer 19 with the plate spring 6 and the flange portion 7a of the inner hub 7.

Figure 11:
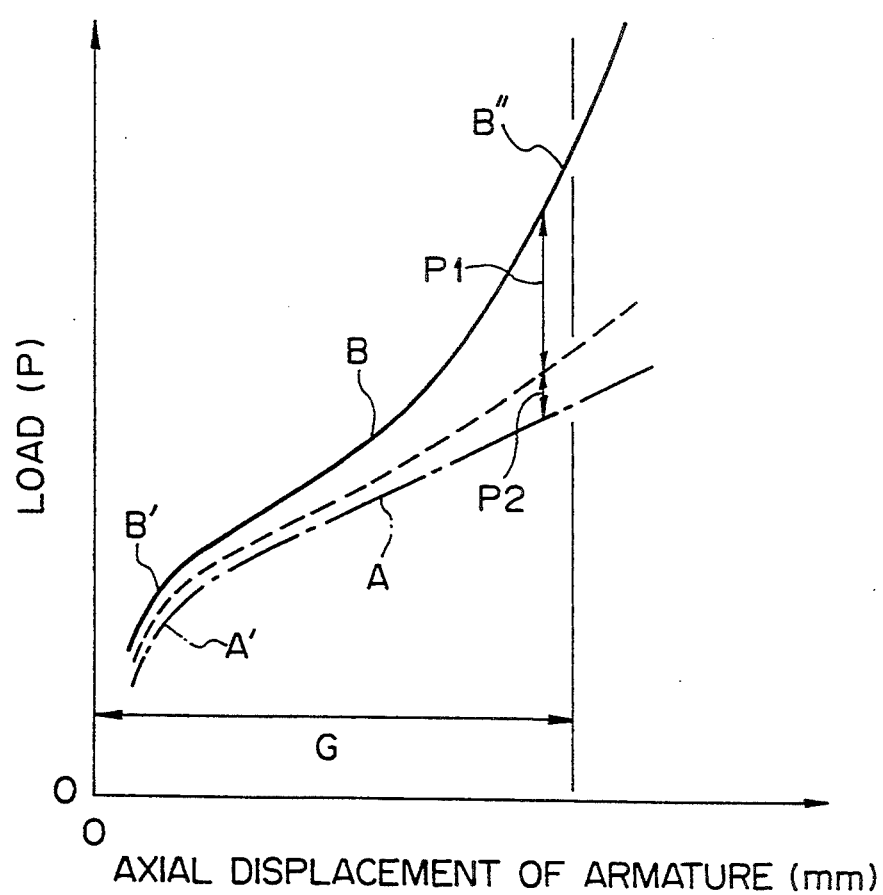
FIG. 11 shows relationships between a displacement of the armature and load in the elastic member.

In FIG. 11, an abscissa shows an axial displacement of the armature 5 from a non-operating position where the electromagnetic coil 3 is de-energized to an operating position where the electromagnetic coil 3 is energized for causing the armature 5 to make contact with the rotor 4. An ordinate shows a force generated in the plate springs 6 which opposes the electromagnetic force generated between the armature 5 and the rotor 4. Relationships in FIG. 11 are obtained under a standstill condition of the inner hub 7, while the armature 5 is moved axially in the direction away from the flange portion 7a of the hub, by measuring a force applied to the inner hub 7. It should be noted that, in FIG. 11, g is the gap between the opposite surfaces of the rotor 4 and the armature 5 under the nonenergized condition of the solenoid 3.

The line A is a result when no provision is made for the elastic member 18, i.e., an elastic force only from the plate springs 6 is used. In this case, upon a gradual increase in the displacement of the armature 5 from the zero value, at the initial stage, a rapid increase in the load is obtained, and at the later stage a slight linear increase in the load is obtained. The initial, rapid increase A' in the load is due to the preload obtained by the stopper cushion 16, which is generated by axially deforming the plate springs 6 when the armature is assembled.

The curve B shows a relationship between the displacement and the load according to the first embodiment as above explained, where the elastic member 18 is provided. At the initial stage, an initial, rapid increase B' in the load is obtained as similar to the curve A' where no elastic member is provided. However, the value of the force (load) with respect to the same value of the displacement becomes slightly larger than that obtained when compared with the case A. This is due to additional forces that are created in the case B, namely a load $P_1$ generated between the arm portions 17 of the plate springs 6 and the presser portions 18c of the elastic member 18 (corresponding to an elastic force of the arm portions 17 plus an elastic force of the presser portions 18c of the elastic member 18) and a load $P_2$ generated between the plate springs 6 and the projected portions 18d of the elastic member 18 (corresponding to an elastic force of the plate springs 6 plus an elastic force of the projected portions 18d of the elastic member 18). A further increase in the displacement of the armature 5 causes the arm portions 17 of greater stiffness than plate springs 6 to be deformed, which causes the combined load of $P_1$ and $P_2$ to be highly increased along a second order function as shown by B''. Namely, the use of the elastic member 18 according to the present invention causes the load to be rapidly increased as the armature 5 is moved toward the rotor 4. In other words, in the case B using the elastic member 18, a rapid increase in the load, which is opposite to the force causing the armature 5 to make contact with the rotor 4, is obtained as the armature 5 approaches the rotor 4.

An operation of the first embodiment will now be briefly explained. Upon the non-energized state of the solenoid 3, the armature 5 is separated from the rotor 4 by means of the elastic force of the plate springs 6, so that the gap g is created between the faced surfaces of the armature 5 and rotor 4. As a result, the rotational movement from the crankshaft (not shown) of the engine transmitted to the pulley assembly 104 is not transmitted to the armature 5 and the inner hub 7. Namely, the rotor 4 freely rotates on the boss portion 103 via the bearing unit 11. When the solenoid 3 is energized, an electromagnetic force is created, which causes the armature 5 to be moved toward the rotor 4 against the force of the plate springs 6, so that the armature 5 and the rotor 4 contact each other at their faced surfaces, causing the rotating movement of the rotor 4 to be transmitted to the armature 5, which is transmitted, via the plate springs 6 and the inner hub 7, to the rotating shaft 102 of the compressor 100. It should be noted that the magnetically, radially separated construction of the rotor 4 by the parts 4-1, 4-2 and 4-3, and of the armature 5 by the parts 5a and 5b causes the magnetic flux between the rotor 4 and the armature 5 to be separated radially, which increases the electromagnetic force for causing the armature 5 toward the rotor 4.

As already explained with reference to FIG. 11, during the displacement of the armature 5 toward the rotor 4 due to the electromagnetic force of the solenoid 3, a rapid increase in the spring force opposing the electromagnetic force is obtained just before contact of the armature 5 with the rotor 4 at their faced surfaces. As a result, movement of the armature 5 toward the rotor 4 is dampened, thereby reducing the impact force upon contact of the armature 5 with the rotor, resulting in a reduction in the noise generated by such a contact. Furthermore, the impact upon the contact of the armature 5 with the rotor 4 is apt to cause vibration in the plate springs 6 and the arm portions 17. However, upon such a vibration, the arm portions 17 are pressed into the pressing portions 18c of the elastic member 18, while the plate springs 6 are pressed into the projected portions 18d of the elastic member 18. As a result, the vibration is dampened.

In short, according to the first embodiment, upon the movement of the armature 5 toward the rotor 4 by the electromagnetic force, just before the contact of the armature 5 with the rotor 4, a rapid increase in the force opposing the movement of the armature 5 toward the rotor 4 is obtained. This tends to reduce the force of the impact generated when the armature 5 makes contact with the rotor 4. As a result, a reduction in the noise, which is generated upon the contact of the armature 5 with the rotor 4, is obtained.

Furthermore, the impact force generated upon contact of the armature 5 with the rotor 4 by means of the electromagnetic force causes a vibration to be generated in the armature 5, the plate springs 6 and the arm members 17. However, such a vibration is dampened by the elastic member 18. As a result, a further reduction in the noise generated by the vibration of the armature 5, the plate springs 6 and the arm members 17 which is induced by the contact of the armature 5 with the rotor 4, is achieved.

The mechanism for reducing the noise generated upon the contact of the armature with the rotor, constructed by the arm members 17, the elastic member 18 and the retainer 19, is sized to be disposed inside the inner diameter of the armature 5. This means that a reduction of the contacting noise is obtained without increasing either the axial or radial dimension of the clutch 1, i.e., without increasing the volume of the clutch 1.

The member for pressing the elastic member 18 is constructed of the arm members 17 which are integral with respective plate springs 6, thus reducing the number of parts and assembly steps required. Furthermore, machining for allowing the elastic member 18 to be held is reduced making it simpler for the armature 5 to be machined.

According to this embodiment, the inner and outer rings 5a and 5b are completely separated in view of the magnetic flux due to the employment of the connection members 20 made of the non-magnetizing material. As a result, no leakage of the magnetic flux occurs between the inner and outer rings 5a and 5b of the armature 5, thereby increasing the electromagnetic force for causing the armature 5 to make contact with the rotor 4, and thereby increasing the torque transmitted by the electromagnetic clutch.

In an application in which an electromagnetic clutch according to the present invention, wherein the armature 5 is connected to the inner hub 7 by way of the plate springs 6, is combined with a scroll type compressor of a single compression chamber, the engine rotational speed, which results in maximum torque variation due to resonance in the plate springs, is around 30,000 r.p.m. This is completely out of the usual rotational speed range for any conventional internal combustion engine. Therefore, during the actual use of the electromagnetic clutch in the scroll type compressor, no resonance of the plate springs occurs, thereby reducing torque variation. Thus, the electromagnetic clutch according to the present invention is advantageous for use with a scroll type compressor. Contrary to this, the inventors have found that a conventional clutch using a torsion type hub including rubber has a resonance frequency, leading to maximum torque variation, that is within the usual range of the engine speed.

Figure 12:
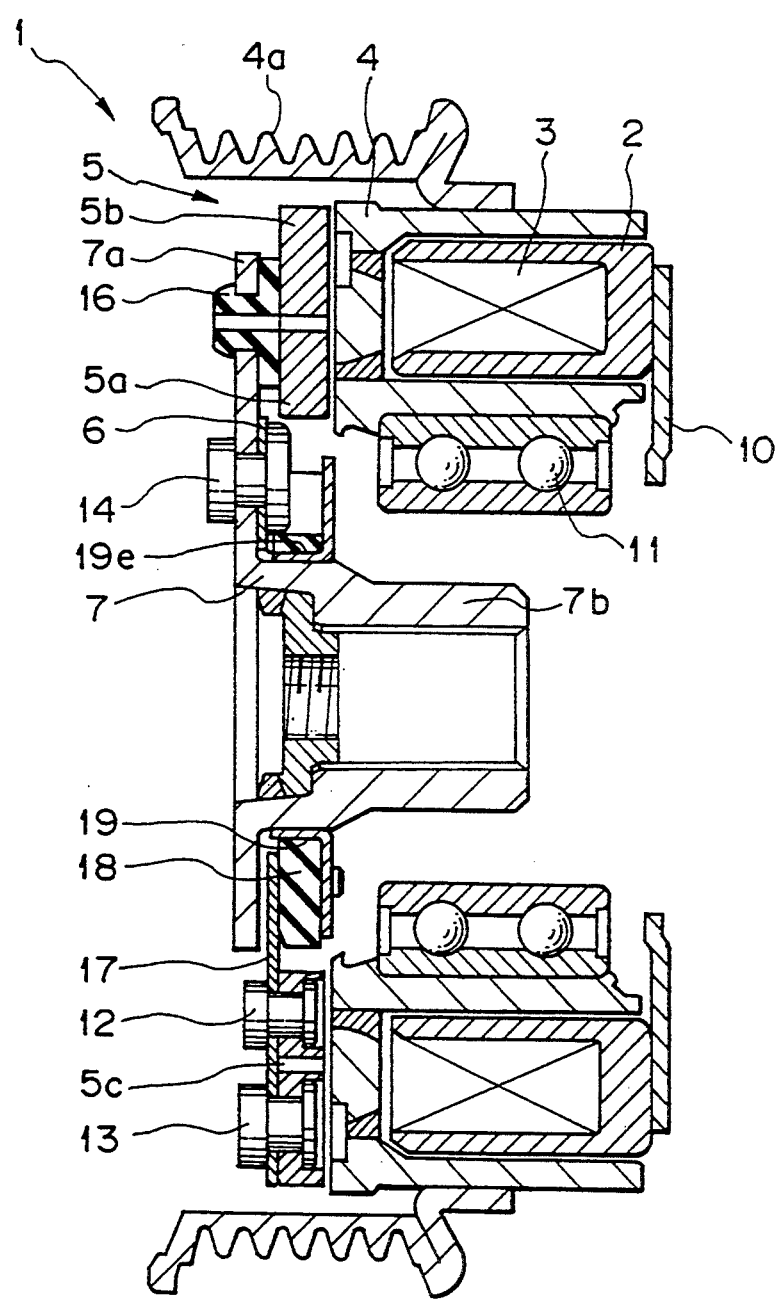
FIG. 12 is similar to FIG. 1 but illustrates a second embodiment.

In a second embodiment shown in FIG. 12, the retainer member 19 is, at its inner peripheral edge, formed with a tubular portion 19e which is press fitted onto the tubular portion 7b of the inner hub 7, so that the retainer member 19 is rigidly fixed onto the inner hub 7. Other constructions are the same as those in the first embodiment. However, unlike the first embodiment in FIG. 1, where the rivets 14 connect the hub 7 not only with the plate springs 6 but also with the retainer 19, the rivets 14 in FIG. 12 connect the hub 7 only with the plate springs 6.

Figure 13:
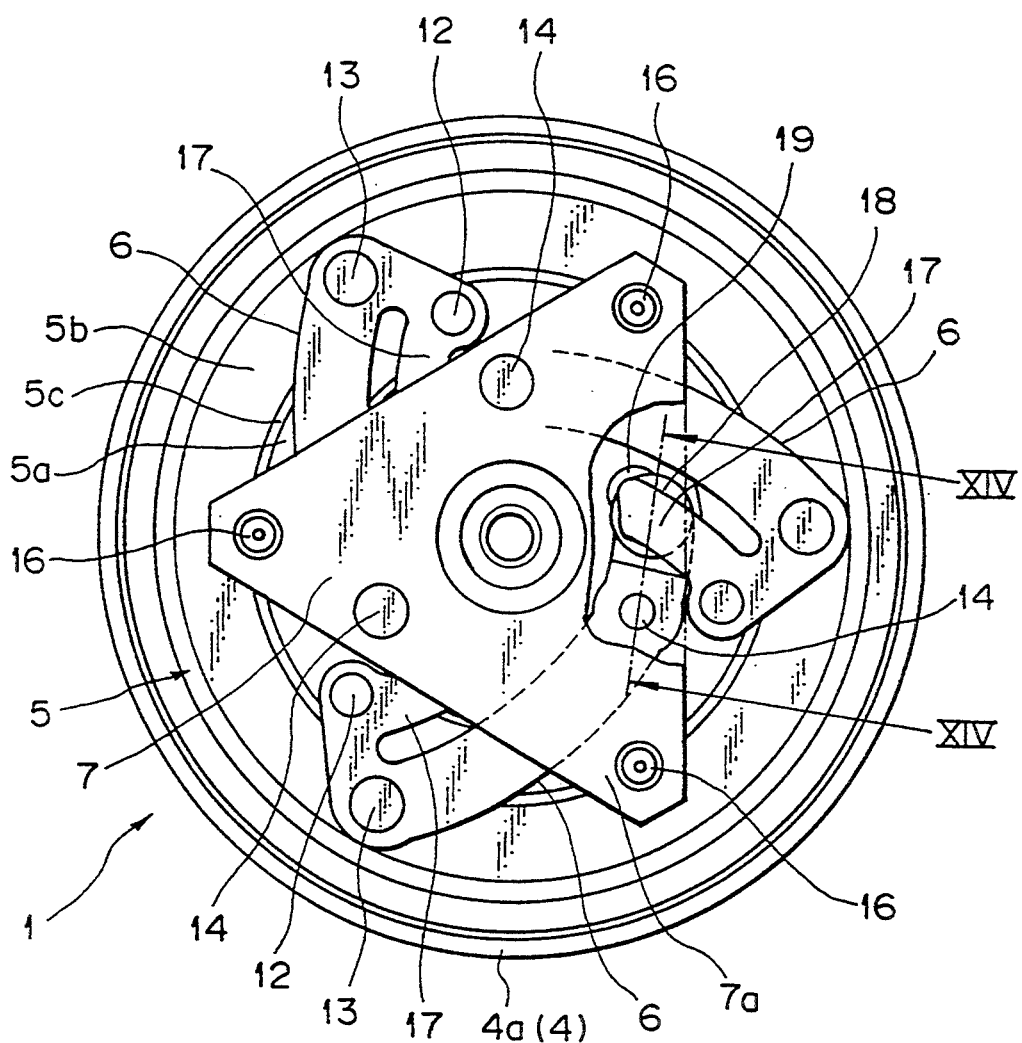
FIG. 13 is a front view of a third embodiment of the electromagnetic clutch according to the present invention.
Figure 14:
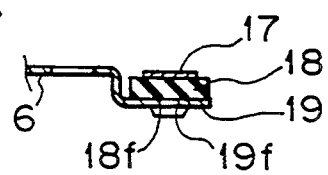
FIG. 14 is a cross sectional view taken along lines XIV—XIV in FIG. 13.
Figure 15:
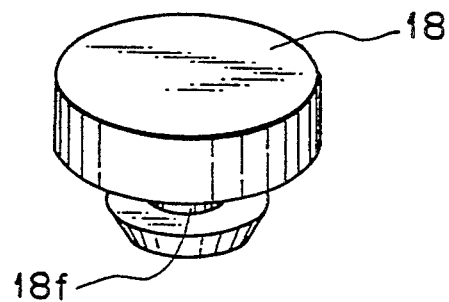
FIG. 15 is a perspective view of an elastic member in the third embodiment in FIG. 13.

FIGS. 13 to 15 show a third embodiment, wherein the retainer member 19 is made integral with respect to the plate springs 6. Namely, the plate spring 6, which is connected to the flange portion 7a of the inner hub 7 by means of the rivet 14, is formed with a stepped portion 19 extending inward of the inner ring portion 5a of the armature 5. This stepped portion 19 acts as a retainer for the elastic member 18. The stepped portion 19 is formed with an opening 19f for connecting the elastic member 18. In this embodiment, the elastic member 18 is formed as a solid pillar of a circular cross sectional shape as shown in FIG. 15, which forms, with a pin 18f, an integral flange at its free end. The pin 18f of the elastic member 18 is fitted into the opening 19f of the stepped portion 19 as a retainer, so that the elastic member 18 is connected to the retainer. For the sake of simplicity, in FIG. 13, only one of the plate springs 6 is shown to be provided with the stepped portion 19 for connection to the elastic member 18 as a solid pillar shape. However, for the remaining two plate springs 6, stepped portions of the same construction are provided for connection to respective pillar shaped elastic members 18.

It should be noted that, in the first to third embodiments, the armature 5 is constructed from inner and outer rings 5a and 5b, which are separate members and which are connected with each other by means of the connecting members 20. However, in these embodiments, an armature can be used where the inner and outer rings 5a and 5b are integrally formed, while an annular bridge portion with a thin wall is created therebetween.

Figure 16:
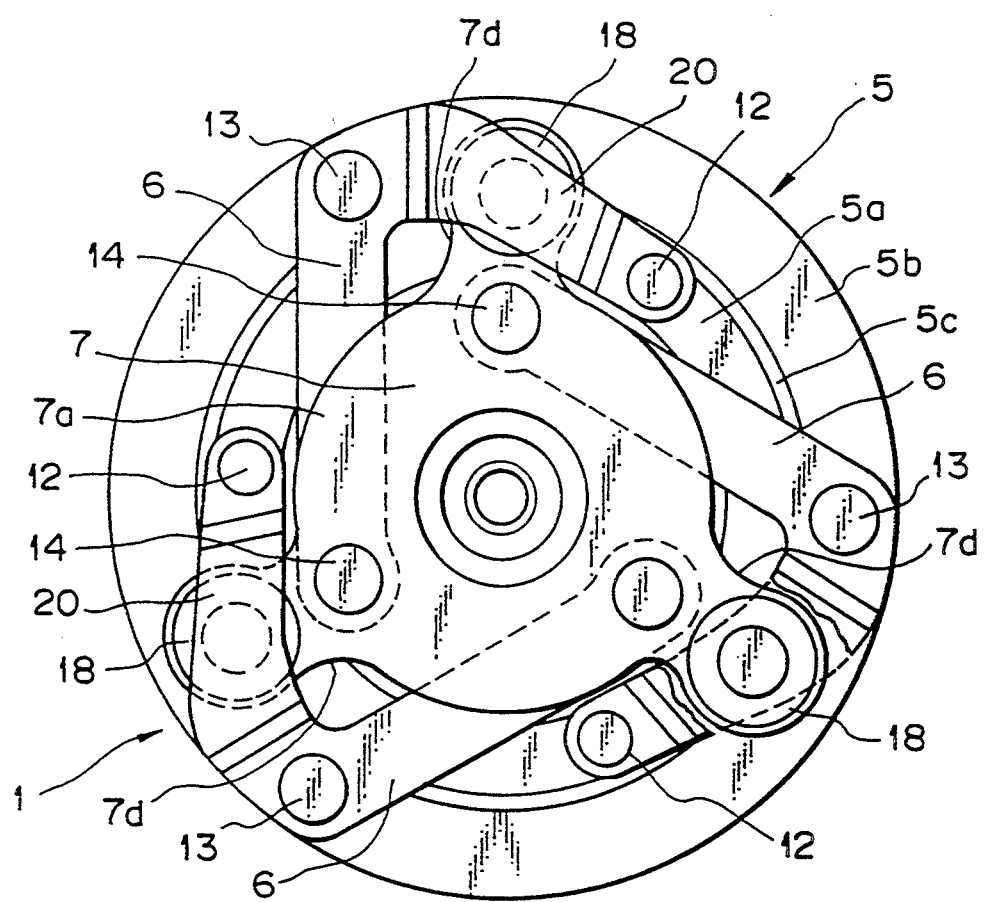
FIG. 16 is a front view of an electromagnetic clutch in a fourth embodiment according to the present invention.
Figure 17:
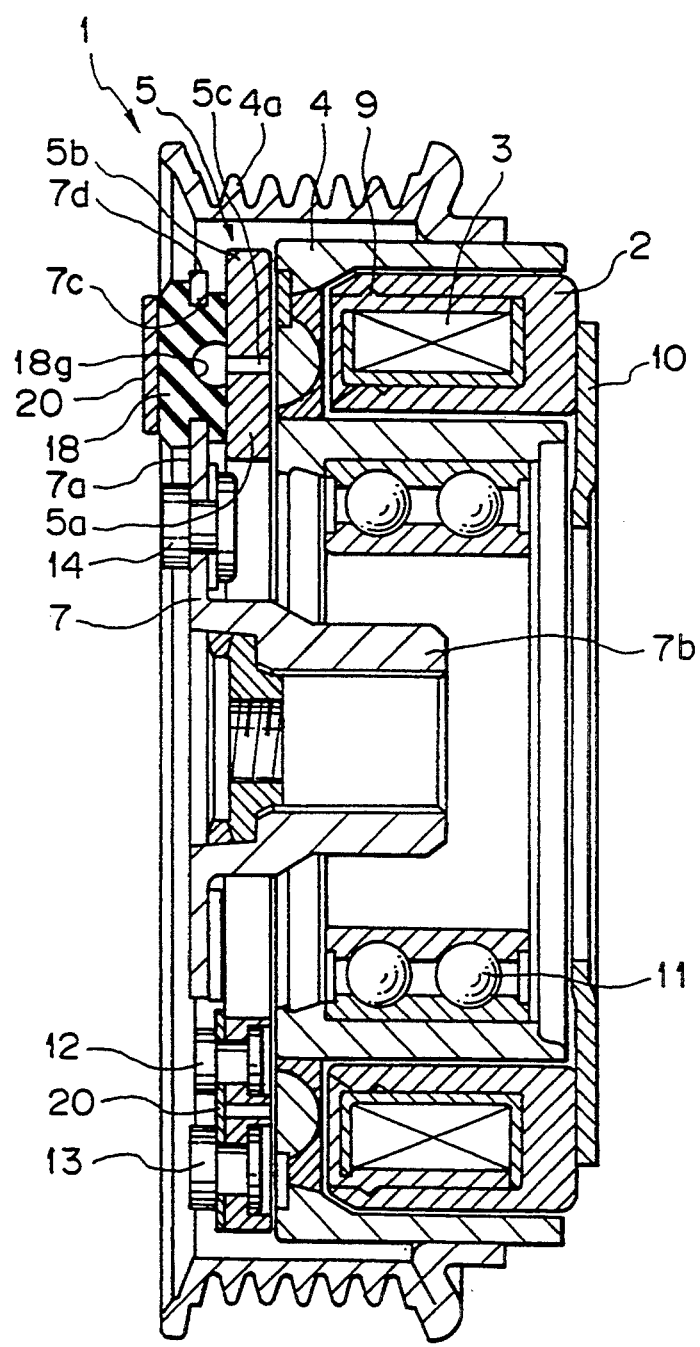
FIG. 17 is a longitudinal sectional view of the electromagnetic clutch in FIG. 16.

FIGS. 16 and 17 show an electromagnetic clutch according to a fourth embodiment of the present invention. This embodiment features that, in a construction for connecting the inner and outer rings 5a and 5b by means of a corresponding connecting member 20 which is integral with the corresponding plate spring 6, the connecting member 20 is formed as a stepped shape which is projected away from the armature 5. The stepped portion of the connecting member 20 compresses the elastic member 18 which is press fitted into the flange portion 7a of the inner hub 7. In this embodiment, the flange portion 7a of the inner hub 7 is formed with three equiangularly spaced radial projections 7d of substantially circular shape having respective openings 7c, into which the elastic members 18 are press fitted. Each of the elastic members 18 is formed as a pillar of circular cross sectional shape made of an elastic material and is formed with an annular groove, with which an inner edge of the corresponding opening 7c of the corresponding radial projection 7d is engaged. It should be noted that the connecting members 20 are made from a non-magnetizing spring material as also explained with reference to the first embodiment.

According to the fourth embodiment, portions of the elastic members 18 located between the connecting members and the flange 7a of the hub 7 are subjected to compression when the armature 5 is moved toward the rotor 4 due to the electromagnetic force occurring between the solenoid 3 and the armature 5. Thus a resistant force opposing the contact of the armature 5 with the rotor is achieved. Furthermore, a portion of the elastic members 18 located between the flange 7a and the armature 5 functions as a stopper cushion as do the members 16 in the first embodiment in FIG. 1. Namely, as shown in FIG. 17, the elastic member 18 projects out of the flange 7a of the inner hub 7 so that it makes contact with the faced wall of the armature 5, causing the corresponding plate spring 6 to be deformed, so that a pre-load is generated in the plate spring 6. As a result, a steep increase (B' in FIG. 11) in the load is obtained in the plate spring 6 at the initial stage of the displacement of the armature 5 toward the rotor 4 as explained with reference to FIG. 11. Furthermore, the elastic members 18 also function to directly dampen the vibration of the armature 5 when the latter is moved toward the rotor 4 due to the electromagnetic force. Upon movement of the armature 5 toward the rotor 4, the connecting members 20 compress the corresponding elastic members 18, thereby damping the vibration of the armature 5.

As shown in FIG. 17, the elastic member 18 forms, at the side facing the armature 5a, a recess 18g. The diameter of the opening 7c at the radial projection 7d of the flange 7a of the inner hub 7 is such that the elastic member 18 is easily inserted into the opening due to the radial deformation of the member 18. This radial deformation of the member 18 is eased by the existence of the recess 18g. Upon the movement of the armature 5 toward the rotor due to an electromagnetic force, the elastic member 18 is subjected to a compression by the connecting member 20, so that the vibration in the connecting member 20 is dampened. Such damping of the connecting member 20 can dampen the vibration of the inner and outer rings 5a and 5b. Due to such a secondary or indirect damping, noise generated by the contact of the armature 5 with the rotor 4 is further reduced.

During the operation of the fourth embodiment, the movement of the armature 5 toward the rotor 4 under the effect of the electromagnetic force causes the elastic members 18 to be compressed by the connecting members 20, causing an elastic force opposing the movement of the armature 5 toward the rotor 4. Just before the armature 5 contacts the rotor 4, the opposing force is steeply increased (curve B" in FIG. 11), which causes the impact to be reduced upon the contact of the armature 5 with the rotor 4 thereby reducing the noise due to impact. Furthermore, the vibration generated at the contact of the armature 5 with the rotor 4 causes a noise to be generated. However, a reduction of such a noise is obtained due to the direct damping of the armature 5 by means of the elastic members 18 and the indirect damping of the armature 5 by means of the connecting members 20.

Furthermore, compression of the elastic members 18 is done by connecting members 20 connecting the inner and the outer rings 5a and 5b. Thus, the number of parts is reduced, and the number of steps required for assembling the device is reduced. Furthermore, the elastic members 18 function also as stopper cushions (16 in FIG. 1) for generating the preload in the armature 5 for obtaining a steep, initial increase (curve A' in FIG. 11) in the load, thus reducing the number of parts and the number of steps during assembly of the device.

Furthermore, additional machining is unnecessary for the armature 5 for reduction of the contacting noise. Thus, the cost of production of the electromagnetic clutch with a mechanism for reducing contacting noise can be reduced.

Figure 18:
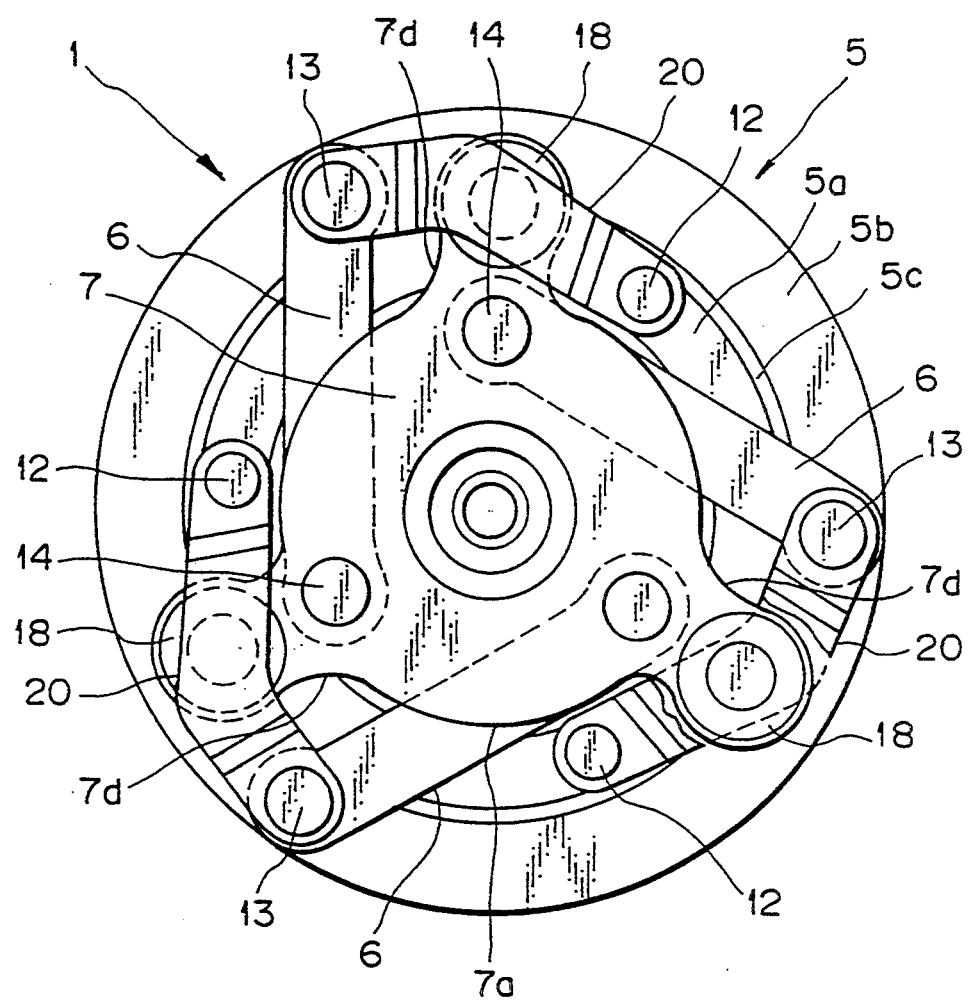
FIG. 18 is a front view of an electromagnetic clutch in a fifth embodiment according to the present invention.

FIG. 18 shows an electromagnetic clutch of a fifth embodiment, where the connecting members 20 are made separated from the corresponding plate springs 6. Each of the connecting members 20 together with the corresponding plate spring 6 is made from a nonmagnetic material, and, similar to the embodiment in FIGS. 16 and 17, is formed so that it extends away from the plate spring to form a step shape, so that it compresses the corresponding elastic member 18.

FIGS. 19 to 23 show a 6th embodiment, in which three equiangularly spaced-apart connecting members 20 each formed as a rivet are provided for connection between the inner and outer rings 5a and 5b of the armature 5. The inner and outer rings, 5a and 5b, are arranged between the flange portion 7a of the inner hub 7 and the rotor 4, and elastic members 18 are arranged between the corresponding connecting members 20 and the inner hub 7 so that the elastic members 18 are compressed therebetween. The connecting members 20 are made of nonmagnetizing material, such as a stainless steel, aluminum based alloy, or copper based alloy, so that any leakage of the magnetic flux is prevented irrespective of an existence of connecting members between the inner and outer rings 5a and 5b.

Each of the elastic members 18 forms a ring shape having an opening 18h therethrough, and has an annular groove at its outer wall. The flange portion 7a of the inner hub 7 is formed with three equiangularly spaced openings 7c, into which the respective elastic members 18 are inserted. The portions of the flange 7a adjacent the inner edges of the openings 7c cooperate with the annular groove in the elastic member 18 so that the elastic members 18 are firmly fixed to the flange portion 7a of the inner hub 7.

Figure 22:
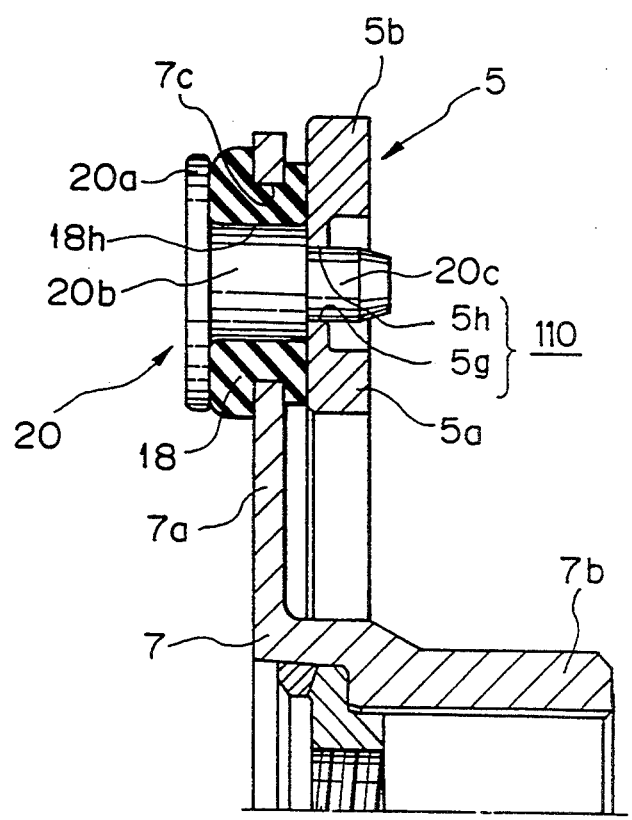
FIG. 22 shows a connecting member before it is deformed.
Figure 23:
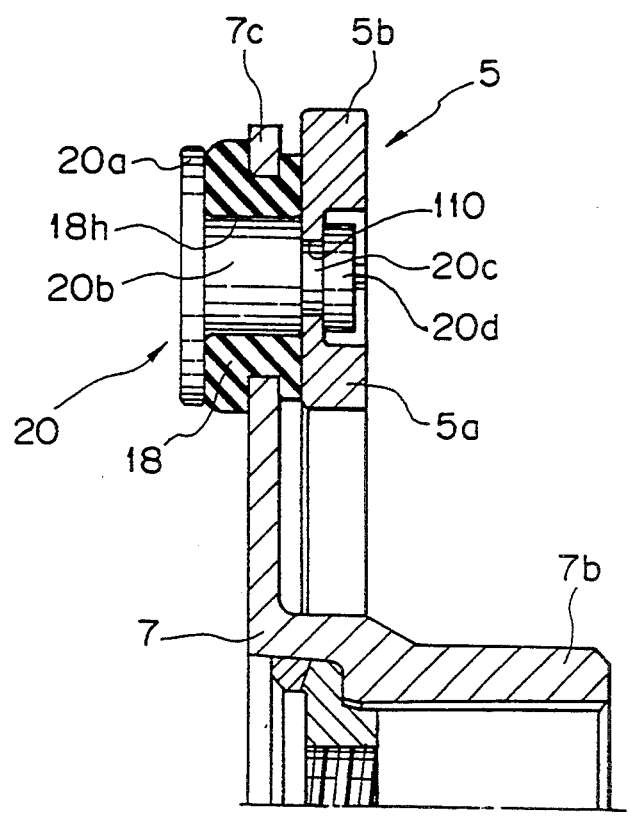
FIG. 23 shows the connecting member after it is deformed.

As shown in FIG. 22, each connecting member 20 of rivet shape is provided with a body portion 20b, a flange 20a at an end of the body portion away from the armature 5, and a stub portion 20c of a diameter smaller than that of the body portion 20b and extending from the other end of the body portion 20b remote from the flange portion 20a. As shown in FIG. 22, the inner ring 5a of the armature 5 is formed with three equiangularly spaced outwardly opened recesses 5g of semicircular shape, while the outer ring 5b of the armature 5 is formed with three equiangularly spaced inwardly opened recesses 5h of semicircular shape. The inner and outer rings are oriented in such a manner that three equiangularly spaced pairs of opposing recesses 5g and 5h form three openings 110 of substantially a circular shape, into which the stub portion 20c of the corresponding connecting member 20 is, as shown in FIG. 22, inserted. The stub portion 20c of each of the connecting members 20 projecting out of the opening 110 is, as shown in FIG. 23, crimped toward the body portion 20b, so that a flange portion 20d is created that engages with the inner edge of the opening 110. Thus, the inner and outer rings 5a and 5b of the armature 5 are sandwiched between the body portion 20b and flange portion 20d of the connecting member 20, and thereby the inner and outer rings 5a and 5b are connected with each other.

Now, a connection of the armature 5 with the inner hub 7 will be explained. First, the elastic members 18 are fitted into the respective openings 7c in the flange portion 7a of the inner hub 7. Then, the plate springs 6 are, at their inner ends, connected to the flange portion 7a by means of the rivets 14, (See FIG. 21). The outer ends of the plate springs 6 are connected to the outer ring 5b by means of the rivets 12. Next, the inner ring 5a is arranged inwardly of the outer ring 5b in such a manner that the semicircular recesses 5g in the inner ring 5b are opposite to the corresponding semicircular recesses 5h in the outer ring 5a so that the openings 110 are created. Then, the barrel portion 20b of each of the connecting members 20 is inserted into the opening 18h of the corresponding elastic member 18, and the stub portion 20c is inserted into the corresponding rivet opening 100 in the armature 5 as shown in FIG. 22. Then, inserted stub portion 20c is crimped so that it is radially "bulged" to form the flange portion 20d due to the plastic deformation as shown in FIG. 23. As a result, the inner and outer rings 5a and 5b are sandwiched between the barrel portion 20b and the flange portion 20d of the rivet 20 (connecting member), which allows the inner and outer rings 5a and 5b to be connected with each other.

It should be noted that, in place of forming the connecting member 20 from metal material capable of obtaining a plastic deformation, it can be made of thermally plastic resin material, such as a nylon. A thermal treatment of the connecting members allows a portion similar to the flange portion 20d (FIG. 23) to be created, which functions in an equivalent manner.

Now, an operation of the 6th embodiment will be explained. Upon the movement of the armature 5 toward the rotor 4 by the electromagnetic force, the connecting member 20 connected to the armature 5 is moved in the same direction, so that the flange portion 20a of the connecting member 20 causes the corresponding elastic member 18 to be compressed. As a result, just before the contact of the armature with the rotor, a force opposing the contact of the armature 5 with the rotor 4 is steeply increased, which causes the impact to be reduced upon the contact of the armature 5 with the rotor, thereby reducing the noise generated upon the contact.

An impact upon the contact of the armature 5 with the rotor 4 causes a noise to be generated. However, at the instant of the contact, the elastic members 18 dampen the armature 5 as well as the connecting members 20, resulting in a reduction of the noise generated at the contact of the armature 5 with the rotor 4.

Figure 24:
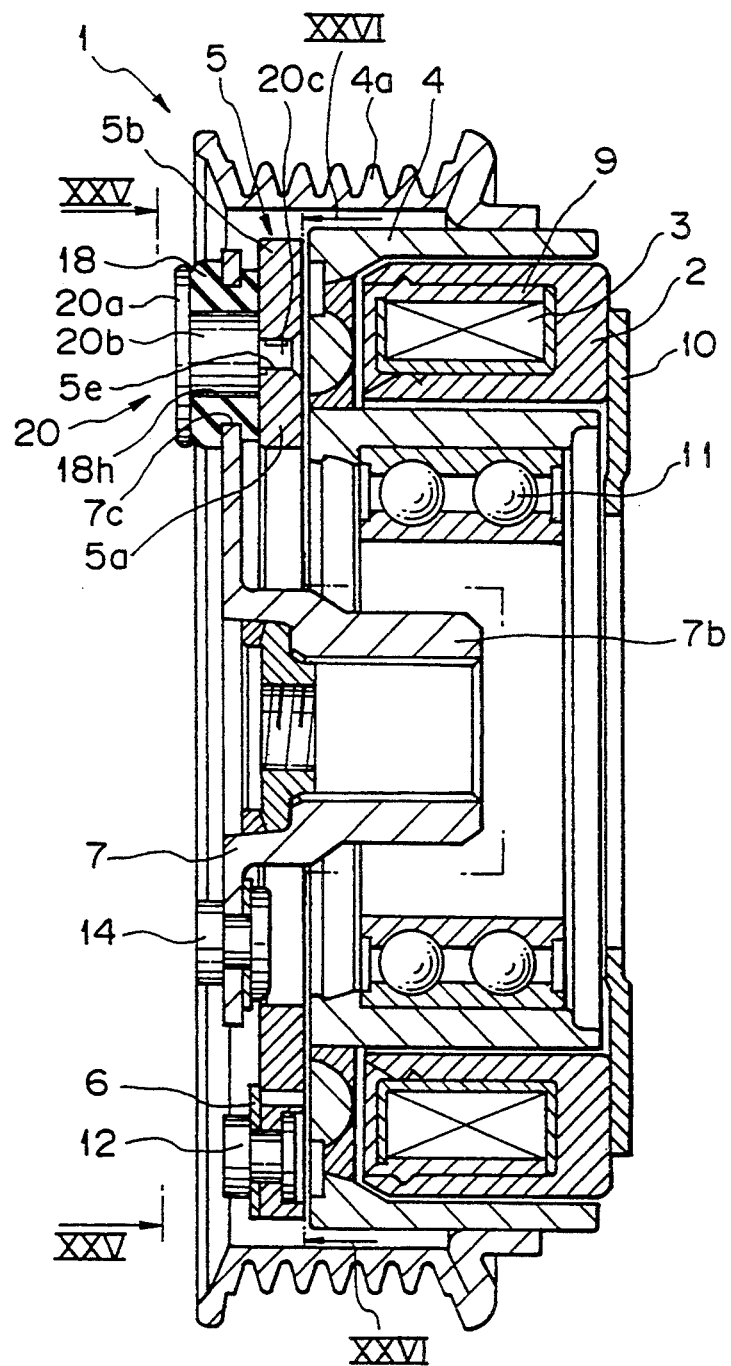
FIG. 24 is a longitudinal sectional view of the electromagnetic clutch in a seventh embodiment.
Figure 25:
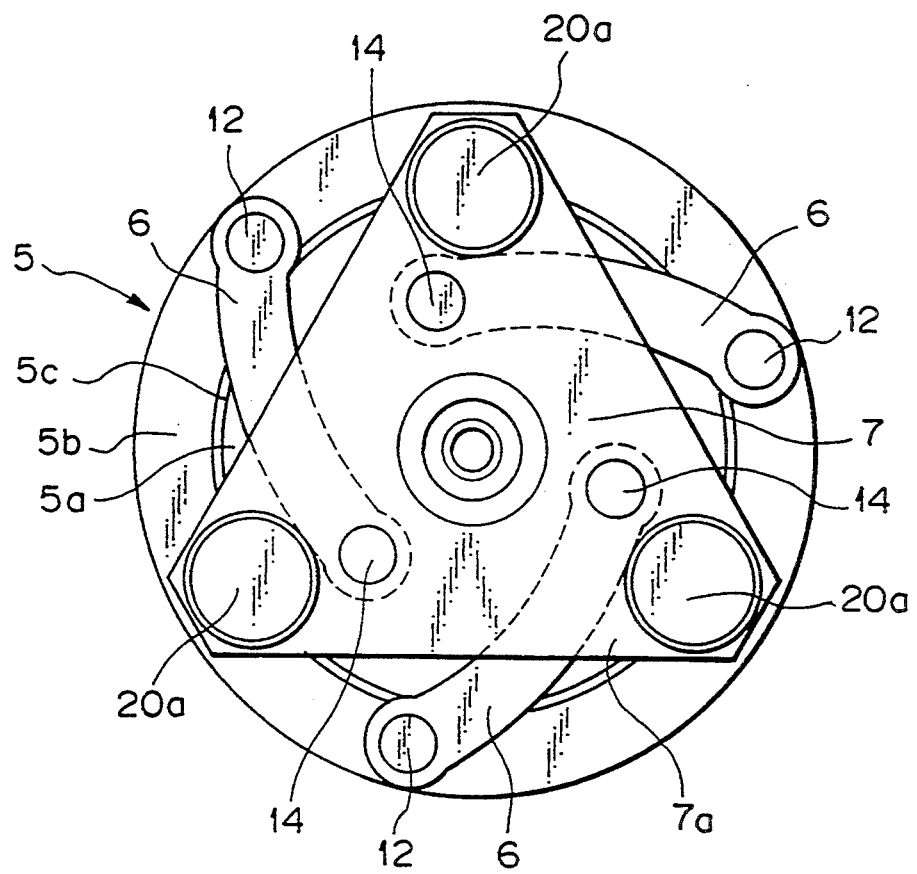
FIG. 25 is a front view of the electromagnetic clutch in FIG. 24.
Figure 26:
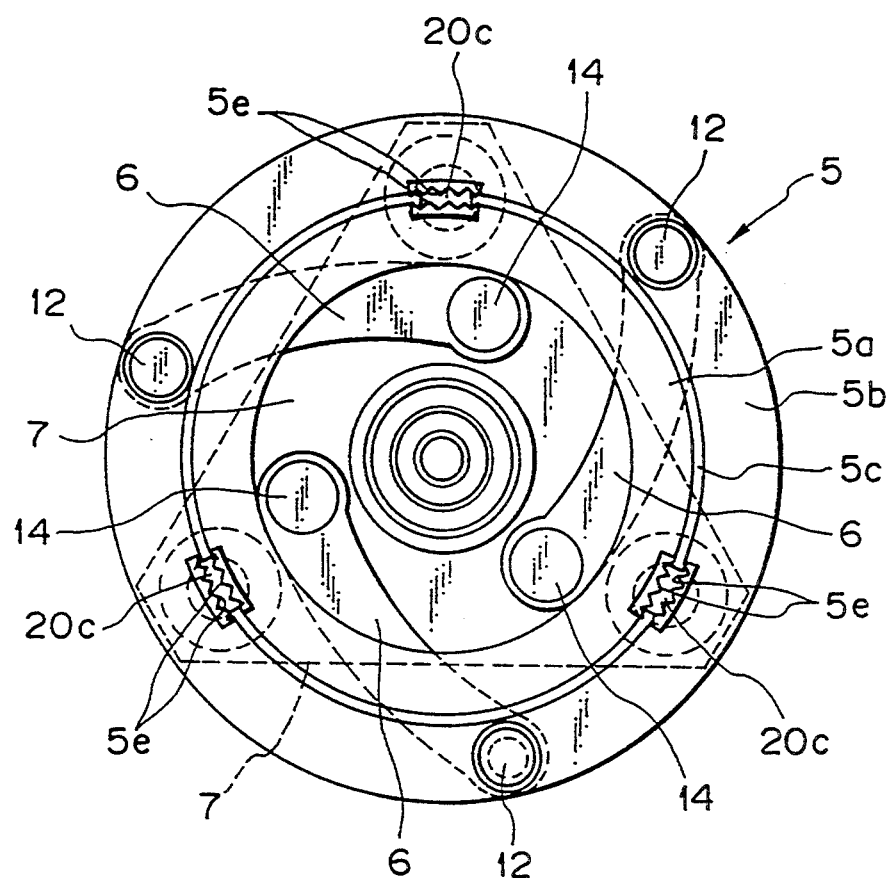
FIG. 26 is a rear view of the electromagnetic clutch in FIG. 24.

FIGS. 24 to 26 show a seventh embodiment. As shown in FIG. 26, the inner and outer rings 5a and 5b are formed with three equiangularly spaced pairs of faced undulated sections 5e having V-shaped grooves therein. The connecting members 20 have flattened inserting portions 20c inserted between the corresponding, faced undulated sections 5e. A plastic deformation of the inserting portion 20c of each of the connecting members 20 causes the corresponding inserting portion 20c to be engaged with the V-shaped grooves of the corresponding undulated section 5e. Thus, a strong connection of the inner and the outer rings 5a and 5b is obtained.

Figure 19:
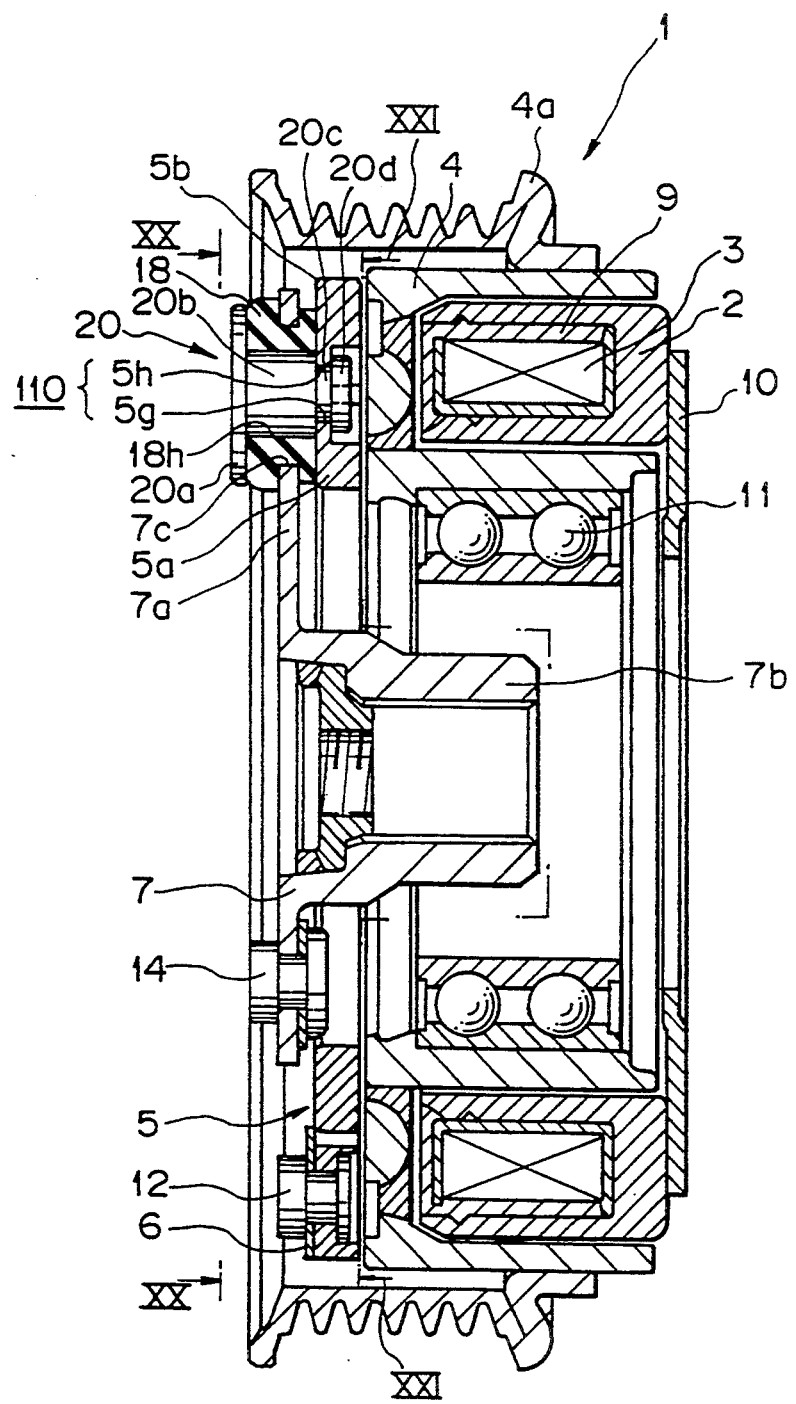
FIG. 19 is a longitudinal sectional view of a sixth embodiment of an electromagnetic clutch according to the present invention.
Figure 20:
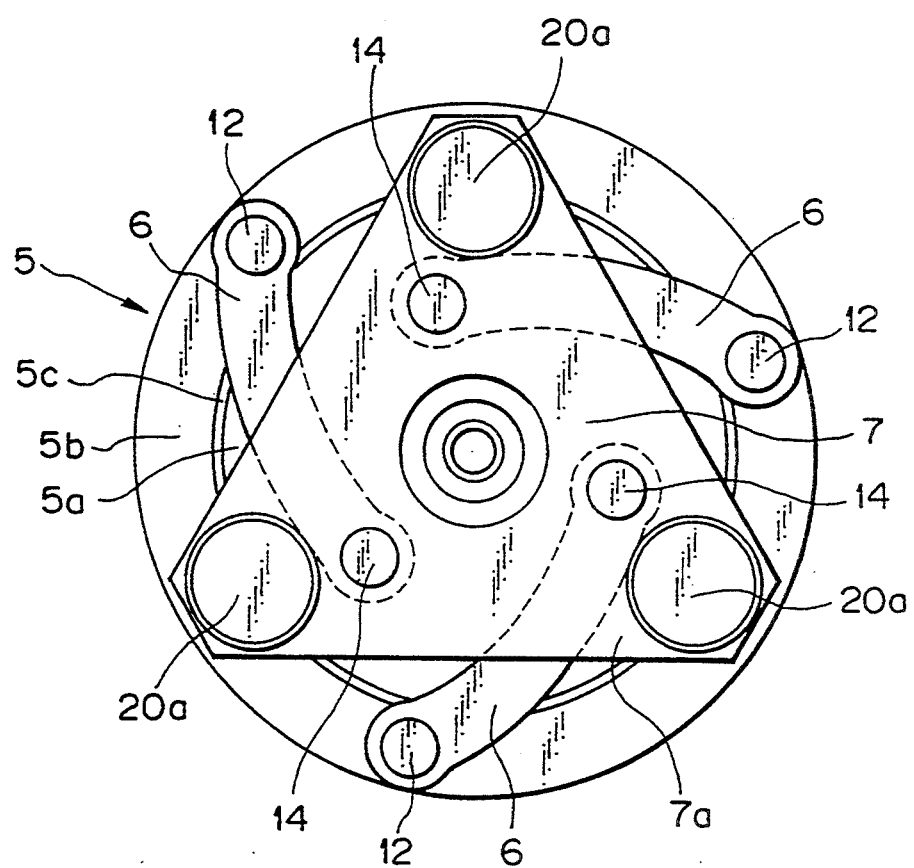
FIG. 20 is a front view of an electromagnetic clutch in a sixth embodiment according to the present invention.
Figure 21:
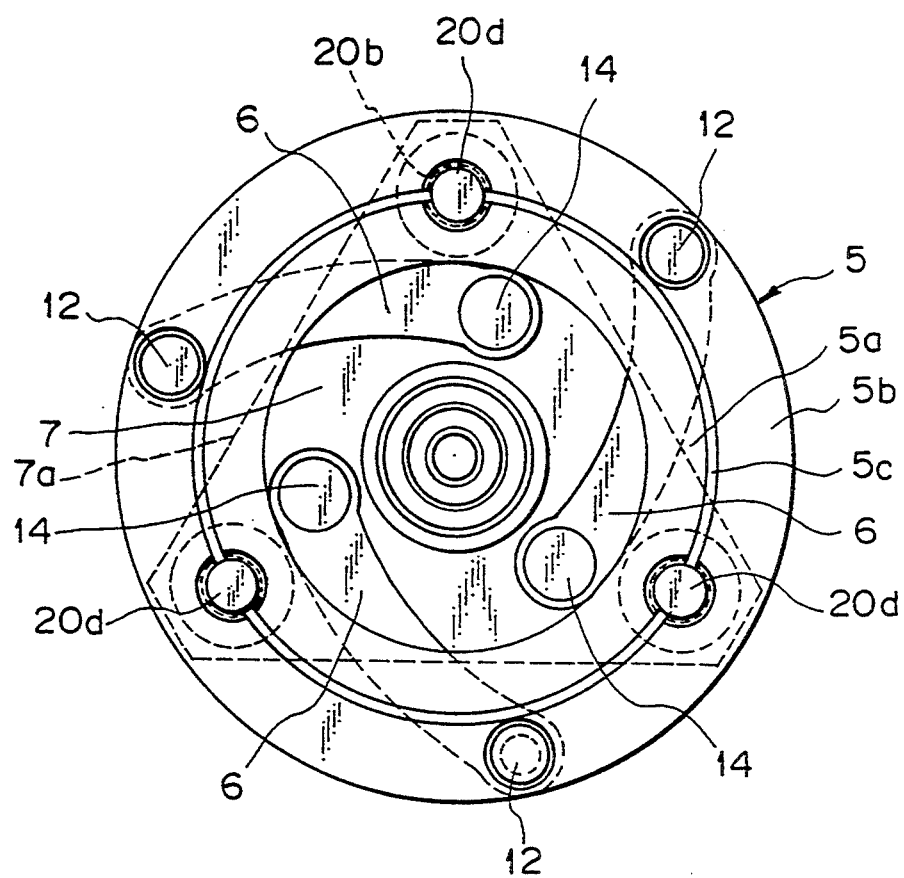
FIG. 21 is a rear view of the electromagnetic clutch in FIG. 20.
Figure 27:
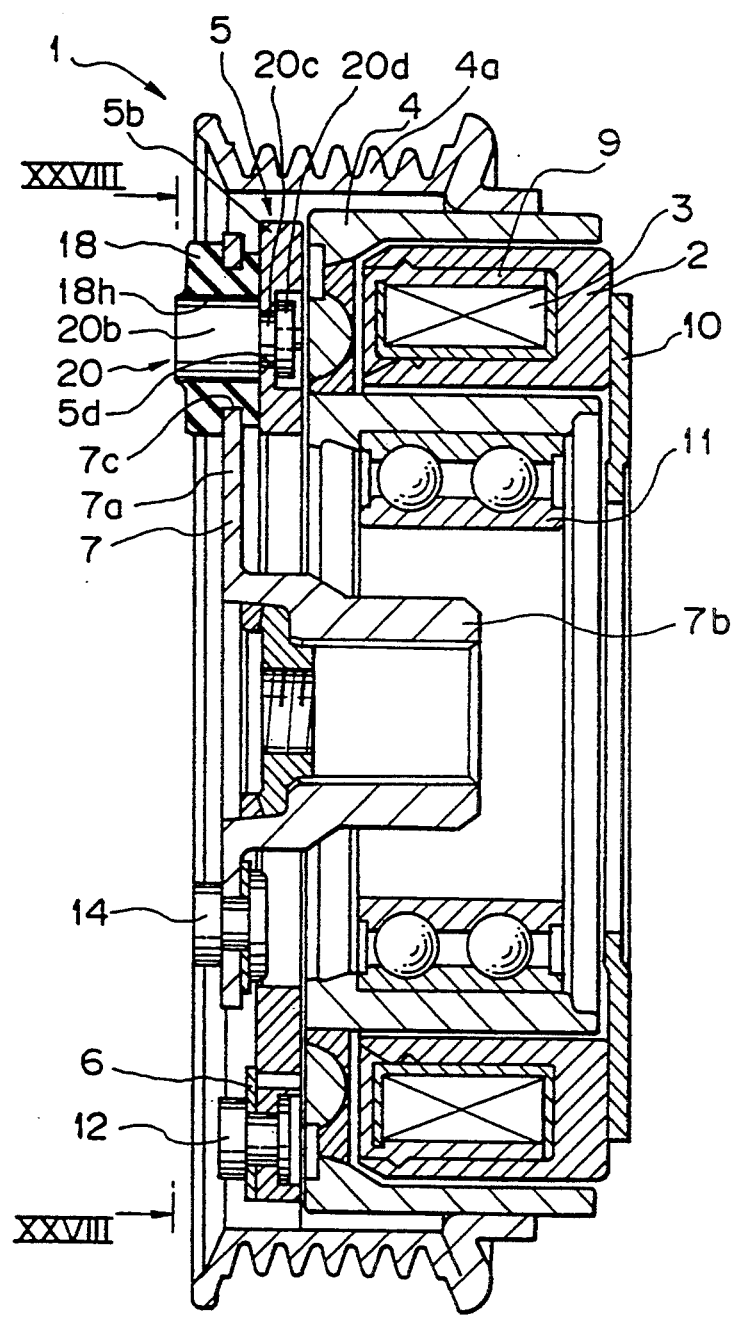
FIG. 27 is a longitudinal sectional view of the electromagnetic clutch in a 8th embodiment.
Figure 28:
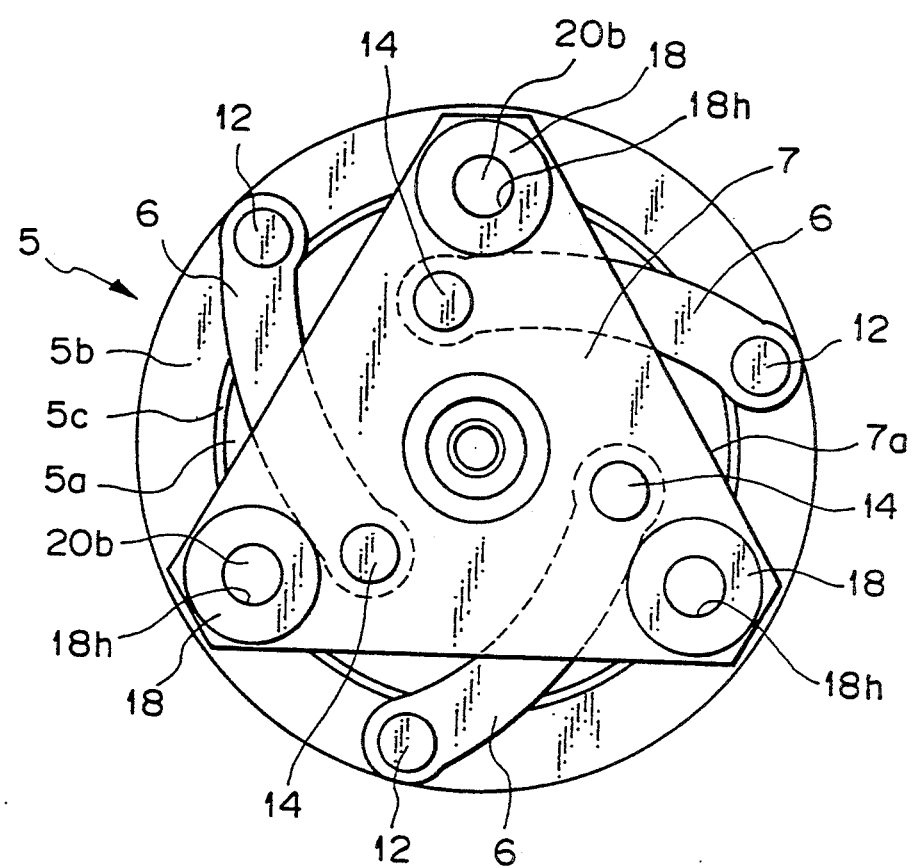
FIG. 28 is a front view of the electromagnetic clutch in FIG. 27.

FIGS. 27 and 28 shows an 8th embodiment, which is similar to the 6th embodiment in FIG. 19. However, in this 8th embodiment, the flange portion 20a of the connecting member 20 in the 6th and 7th embodiments of FIGS. 19 and 24 is eliminated. The insert opening 18h of the elastic member 18 and the barrel portion 20b of the connecting member 20 are connected with each other by means of adhesive agent.

As a result, the movement of the armature 5 toward the rotor 4 causes the inner side of the elastic members 18 to be pulled toward the rotor 4, causing them to be elastically deformed, so that, just before the contact of the armature 5 with the rotor 4, a steep increase in the force opposing the movement of the armature 5 toward the rotor 4 is obtained. Thus, a reduction in the impact upon the contact of the armature 5 with the rotor 4 is obtained, thereby reducing the contacting noise.

While embodiments are described with reference to the attached drawings, many modifications and changes can be made by those skilled in this art without departing from the scope and spirit of the present invention.

We claim:

1. An electromagnetic clutch, comprising:
   a stationary electromagnetic coil which generates an electromagnetic force when energized;
   a rotor for receiving a rotating movement from a rotating movement source;
   an armature which, upon the electromagnetic force from the coil, is urged into contacting engagement with the rotor;
   a rotating driven member which rotates together with the armature;
   plate spring members arranged between the armature and the rotating driven member for causing the armature and the rotor to be spaced from each other when the electromagnetic coil is not energized;
   the electromagnetic force causing the armature to be moved toward the rotor against the force of the plate springs for causing them to contact each other;
   arms extending integrally and inwardly from corresponding plate springs;
   an elastic member; and
   a retainer member for retaining the elastic member between the retainer member and the arms connected to the rotating driven member at a location radially inside the armature.

2. An electromagnetic clutch according to claim 1, wherein said plate springs are made from non-magnetizing material.

3. An electromagnetic clutch according to claim 1, further comprising cushion members arranged between the rotating driven member and the armature for obtaining a preloading in the plate springs.

4. An electromagnetic clutch according to claim 1, wherein the rotating driven member includes a tubular portion and a flange portion connected to the tubular portion, wherein the retainer member forms a ring shape fixedly connected to the tubular portion, and is constructed by angularly spaced support portions and recess portions located between the adjacent support portions, and wherein the elastic member is formed as a ring member having angularly spaced arc shaped radial projections, which are fitted in said recess portions of the retainer member, wherein said arms are in contact with the corresponding arc shaped portions.

5. An electromagnetic clutch according to claim 1, wherein each of the plate springs forms a radially extending stepped portion as the retainer, and wherein the elastic members are formed as circular pillar members arranged between respective pairs of the stepped portions and arms.

6. An electromagnetic clutch comprising:
   a stationary electromagnetic coil which generates an electromagnetic force when energized;
   a rotor connected to an outside rotating source to be subjected to a rotating movement therefrom;
   an armature which, upon the electromagnetic force from the coil, is urged into contacting engagement with the rotor, the armature being constructed by inner and outer rings which are radially separated from each other;
   a rotating driven member which rotates together with the armature;
   plate spring members arranged between the armature and the rotating driven member for causing the armature and the rotor to be spaced from each other when the electromagnetic coil is not energized;
   the electromagnetic force causing the armature to be moved toward the rotor against the force of the plate springs for causing them to contact each other;
   connecting members for connecting the inner and outer rings of the armature with each other, and;
   elastic members arranged between the rotating driven member and the connecting members.

7. An electromagnetic clutch, comprising:
   a stationary electromagnetic coil which generates an electromagnetic force when energized;
   a rotor for receiving a rotating movement from a rotating movement source;
   an armature which, upon the electromagnetic force from the coil, is urged into contacting engagement with the rotor, the armature including an inner ring and an outer ring which are radially spaced from each other and connecting members for connecting the inner and outer rings;
   a rotating driven member which rotates together with the armature;
   plate spring members arranged between the armature and the rotating driven member for causing the armature and the rotor to be spaced from each other when the electromagnetic coil is not energized;
   the electromagnetic force causing the armature to be moved toward the rotor against the force of the plate springs for causing them to contact each other;
   arms extending integrally from corresponding connecting members, radially inwardly therefrom;
   an elastic member; and
   a retainer member for retaining the elastic member between the retainer member and the arms connected to the rotating driven member at a location radially inside the armature.

8. An electromagnetic clutch according to claim 7, wherein said plate springs and said connecting members are made from non-magnetizing material.

9. An electromagnetic clutch for transmitting a rotational movement from a rotating movement source, to a rotating device, comprising:

a support member;

a rotor which rotates about its own axis;

means for rotatably supporting the rotor on the support member;

a hub which includes an axially extending tubular portion connected to the rotating device and a radially extending flange portion;

an armature rotating together with the hub, which includes an inner ring and an outer ring which are radially separate from each other;

the rotor and the armature having faced surfaces extending transverse to their axis of the rotation;

a plurality of angularly spaced plate springs, each of which has an end connected to the outer ring of the armature and a second end connected to the flange portion of the hub;

connecting members for connecting the inner and outer rings, so that a spring force is created for causing the inner and outer rings of the armature to be moved away from the rotor, so that an axial gap is created between said faced surfaces of the armature and the rotor;

a stationary solenoid arranged in the rotor, which, when energized, generates an electromagnetic force causing the armature to be moved toward the rotor against the force of the plate springs, so that said faced surfaces of the armature and the rotor contact each other, allowing the rotational movement from the rotating movement source to be transmitted to the rotating device, via the armature and the hub, and;

means arranged between the plate springs and the hub for obtaining a steep increase in a force opposing the movement of the armature toward the rotor at a final stage immediately preceding contact of the armature with the rotor thereby reducing noise generated upon the contact of the armature with the rotor.

10. An electromagnetic clutch according to claim 9, further comprising cushion members arranged between the flange portion of the hub and the armature so that a desired value of the gap between the faced surfaces of the armature and the rotor is obtained for obtaining a desired value of a preload in the plate springs.

11. An electromagnetic clutch according to claim 9, wherein said means comprise:

arms which extend radially inwardly and integrally from the corresponding connecting portions;

a ring shaped elastic member arranged on the tubular portion of the hub; and a retainer for retaining the ring shaped elastic member between the retainer and the arms fixedly connected to the tubular portion of the hub, and having an engaging surface spaced from the arms;

the ring shaped elastic member being sandwiched between the arms and the retainer during the movement of the armature toward the rotor for causing the elastic member to be pressed by the arms, so that the steep increase in the force opposing the movement of the armature toward the rotor at the final stage is obtained.

12. An electromagnetic clutch according to claim 9, wherein each of the plate springs has a stepped portion extending radially from the inner ring of the armature and facing a corresponding arm portion of the plate spring, and wherein said means comprise elastic members of a pillar shape arranged between a corresponding faced set of the stepped portion and the arm in such a manner that, during the movement of the armature toward the rotor, the elastic member is pressed by the arms, so that the steep increase in the force opposing the movement of the armature toward the rotor at the final stage is obtained.

13. An electromagnetic clutch according to claim 9, wherein the shape of the connecting members is such that the connecting members have portions located on one side of the flange of the hub remote from the armature, and wherein said means comprise elastic members of pillar shape fitted to the flange portion of the hub, the elastic members being pressed between the connecting members and the flange of the hub during the movement of the armature toward the rotor, so that the steep increase in the force opposing the movement of the armature toward the rotor at the final stage is obtained.

14. An electromagnetic clutch according to claim 13, wherein the elastic members also have integral portions arranged between the flange portion of the hub and the armature so that a desired value of the gap between the faced surfaces of the armature and the rotor is obtained for obtaining a desired value of a preload in the plate springs.

15. An electromagnetic clutch according to claim 9, wherein said inner and outer rings of the armature have angularly spaced pairs of outer and inner recesses for defining, together, openings, wherein said connecting members are formed as axially extending members having inserted portions to be inserted into the respective openings;

wherein said means comprises sleeve shaped elastic members fitted to the flange portion of the hub, and through which said axially extending members are respectively passed, the elastic members being elastically deformed by the movement of the axially extending members during the movement of the armature toward the rotor, so that the steep increase in the force opposing the movement of the armature toward the rotor at the final stage is obtained.

16. An electromagnetic clutch according to claim 15, wherein each of the axially extending members comprises a rivet and has a radially extending outer engaging portion located on one side of the flange of the hub remote from the armature, the radially extending outer engaging portion presses the corresponding elastic member toward the flange of the hub.

17. An electromagnetic clutch according to claim 15, wherein said recesses are formed as undulated sections, which engage with the corresponding inserted portions.

* * * * *